United States Patent Office 3,555,024
Patented Jan. 12, 1971

3,555,024
1-(3-AMINOPYRAZINOYL)SEMICARBAZIDES, 1-(3-AMINOPYRAZINOYL) - THIOSEMICARBAZIDES, AND METHOD FOR THEIR PREPARATION
Edward J. Cragoe, Jr., and John B. Bicking, Lansdale, and Kenneth L. Shepard, Ambler, Pa., assignors to Merck & Co., Inc., Rahway, N.J., a corporation of New Jersey
No Drawing. Filed Nov. 13, 1968, Ser. No. 775,543
Int. Cl. C07d 51/76
U.S. Cl. 260—250                     13 Claims

ABSTRACT OF THE DISCLOSURE 1-(3-aminopyrazinoyl)semicarbazides and -thiosemicarbazides are described that can optionally be substituted in the 5- and/or 6-position of the pyrazinoyl moiety and additionally optionally substituted on the carbazide nitrogen are prepared by the reaction of the selected 3-aminopyrazinoic acid hydrazide and the selected isocyanate or isothiocyanate. The products possess natriuretic and diuretic properties without kaluretic properties and are useful in the treatment of conditions associated with an abnormal retention of sodium and chloride ions such as the treatment and management of edematous conditions.

---

This invention is concerned with novel 1-(3-aminopyrazinoyl)-semicarbazides and -thiosemicarbazides that possess useful saluretic and diuretic properties as well as novel processes for their preparation. The products of this invention are useful therefore in the treatment or management of edema and other abnormalities resulting from the retention of excess quantities of sodium and fluid by the animal organism.

The 1-(3-aminopyrazinoyl)-semicarbazides and -thiosemicarbazides of this invention have the structural formula

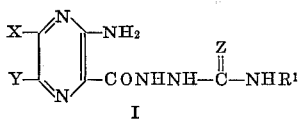

I wherein:

X is selected from hydrogen and amino of the structure $NR^5R^6$ wherein $NR^5R^6$ represents an unsubstituted or a substituted amino group wherein $R^5$ is selected from
 (1) hydrogen,
 (2) alkyl, preferably lower alkyl or from 1 to about 6 carbon atoms either straight or branched chain and either saturated od unsaturated, e.g., methyl, ethyl, propyl, isopropyl, allyl, propenyl, butyl, isobutyl, secondary butyl, pentyl, isopentyl, neopentyl, hexyl and the like,
$R^6$ is selected from
 (1) hydrogen,
 (2) alkenyl, preferably lower alkenyl of from 3 to about 5 carbon atoms, e.g., allyl, propenyl or the like,
 (3) alkynyl, preferably lower alkynyl of from 3 to 5 carbon atoms, e.g., propargyl and the like,
 (4) lower cycloalkyl of from 3 to about 7 carbon atoms, e.g., cyclopropyl, cyclopentyl, cyclohexyl, cycloheptyl and the like,
 (5) mononuclear aryl, especially phenyl, either unsubstituted or substituted, such as with halo, e.g., chloro, bromo, or fluoro, lower alkyl of from 1 to about 3 carbon atoms, e.g., methyl, ethyl, and propyl, or lower alkoxy, e.g., methoxy, ethoxy, propoxy, and the like.
 (6) lower alkoxy, preferably lower alkoxy of from 1 to 4 carbon atoms, e.g., methoxy, ethoxy, isopropoxy and the like,
 (7) substituted amino selected from pyridylamino and pentamethyleneamino,
 (8) alkyl, preferably lower alkyl of from 1 to about 6 carbon atoms either straight or branched chain such as methyl, ethyl, propyl, isopropyl, butyl, isobutyl, secondary butyl, tertiary butyl, pentyl, isopentyl, neopentyl, hexyl and the like, either substituted or unsubstituted with one or more substituents selected from
  (a) lower alkoxy of from 1 to about 3 carbon atoms, e.g., methoxy, ethoxy, propoxy and the like,
  (b) lower cycloalkyl of from 3 to about 6 carbon atoms, e.g., cyclopropyl, cyclopentyl, cyclohexyl and the like,
  (c) heterocyclic group of 5 or 6 nuclear members and containing one or more hetero atoms selected from oxygen and nitrogen, especially furyl and pyridyl,
  (d) mononuclear aryl, especial phenyl, either unsubstituted or substituted with such as halo, e.g., chloro, bromo, or fluoro, lower alkyl of from 1 to about 3 carbon atoms, e.g., methyl, ethyl, or propyl, or lower alkoxy of from 1 to about 3 carbon atoms, e.g., methoxy, ethoxy, propoxy and the like,
  (e) —$NR^7R^8$ wherein
$R^7$ is selected from
 (1) alkyl, preferably lower alkyl of from 1 to about 5 carbon atoms, e.g., methyl, ethyl, propyl, isopropyl, butyl, isobutyl, secondary butyl, pentyl, isopentyl, neopentyl and the like,
 (2) lower alkylcarbonyl, of from 2 to about 3 carbons, e.g., acetyl, propionyl, and the like,
$R^8$ is alkyl, preferably lower alkyl of from 1 to about 5 carbon atoms, e.g., methyl, ethyl, propyl, isopropyl, butyl, isobutyl, secondary butyl, pentyl, isopentyl, neopentyl, and the like,
$R^7$ and $R^8$ when lower alkyl can be linked together either directly or through a hetero atom such as nitrogen or oxygen to form a heterocyclic ring with the nitrogen to which they are attached, e.g., piperidino, pyrrolidinyl, morpholino, piperazinyl, N-lower alkyl piperazinyl, and the like;
$R^5$ and $R^6$ when lower alkyl can be linked together either directly or through a hetero atom such as nitrogen or oxygen to form a heterocyclic ring with the nitrogen atom to which they are attached forming, e.g., piperidino, pyrrolidinyl, morpholino, piperazinyl, N-lower alkyl-piperazinyl, and the like;
Y is hydrogen, halogen, preferably chloro, bromo or iodo, phenyl, lower alkyl;
Z is selected from oxygen and sulfur; and
$R^1$ is selected from hydrogen, lower alkyl, lower alkenyl, phenyl, halo(chloro or bromo)-phenyl, and phenyl-lower alkyl ($C_{1-3}$).

In the foregoing definitions unless otherwise noted, the lower alkyl radicals advantageously have from 1 to 5 carbon atoms and are either straight or branched chain, the lower alkenyl radicals have from 3 to 5 carbon atoms and the cycloalkyl radicals have from 3 to 6 nuclear carbons and are selected from cyclopropyl, cyclobutyl, cyclopentyl and cyclohexyl.

The products of this invention are prepared by the reaction of a 3-aminopyrazinoic acid hydrazide with the selected isocyanate or isothiocyanate according to the following scheme:

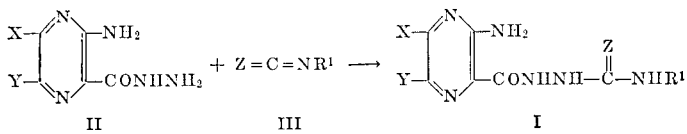

This reaction preferably is carried out in the presence of a solvent and with heating from about steam bath temperature up to the reflux temperature of the reaction mixture. The reactants can be employed in equimolecular quantity although an excess of one or the other can be used, usually an excess of the cyanate, III. Solvents such as lower alkanols, acetonitrile, acetic acid, dilute hydrochloric acid or pyridine can be employed for the reaction medium although other usual solvents can be used as well.

Although many of the pyrazinoic acid hydrazides, II, are known compounds, those that are not known can be prepared by known methods including reaction of an alkyl pyrazinoate and hydrazine.

The intermediate esters generally are prepared by one of the processes shown below. Many esters, however, previously have been described, some of which were made by methods other than those illustrated below which methods would also be useful in preparing the desired ester starting materials.

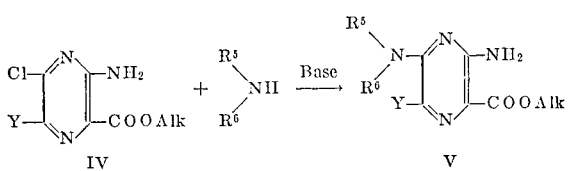

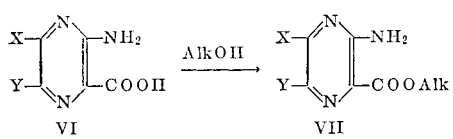

The products of this invention can be administered to man or animals in the form of pills, tablets, capsules, elixirs, injectable preparations and the like and can comprise one or more of the compounds of this invention as the only essential active ingredient of the pharmaceutical formulation or the novel product(s) can be combined in pharmaceutical formulations with other diuretic agents or indeed other therapeutic agents. The products of this invention advantageously are administered at a dosage range of from about 5 mgs. per day to about 750 mgs. per day or at a somewhat higher or lower dosage at the physician's discretion, preferably in subdivided amounts on a 2 to 4 times a day regimen. These formulations can be prepared by the usual methods for making unit dosage forms of compounds for oral or parenteral administration.

In the following text illustrative methods for making intermediates and their use in preparing the novel products of this invention are detailed in the following order:

(A) Preparation of the alkyl 3-amino-5-X-6-Y-pyrazinoates
(B) Preparation of the hydrazides from the pyrazinoates of (A)
(C) Examples illustrative of the preparation of the novel pyrazinoylsemicarbazides from the hydrazides of (B)
(D) Examples illustrative of the preparation of the novel pyrazinoylthiosemicarbazides of this invention from the hydrazides of (B)

SECTION A

Preparation of alkyl 3-amino-5-X-6-Y-pyrazinoates

A–1: Methyl 3-amino-5-dimethylamino-6-chloropyrazinoate.—A suspension of methyl 3-amino-5,6-dichloropyrazinoate (178 g., 0.8 mole) in 2-propanol (1.1 liters) is stirred while dimethylamine (200 g., 4.44 moles) in 2-propanol (2 liters) is added, and then the mixture is refluxed for an hour. The product that separates is removed by filtration and dried. The yield is 177.2 g. (97%). After recrystallization from methanol the methyl 3-amino-5 - dimethylamino - 6 - chloropyrazinoate melts at 145.5–146.5° C.

Analysis.—Calc'd for $C_8H_{11}ClN_4O_2$ (percent): C, 41.66; H, 4.81; N, 24.29. Found (percent): C, 41.73; H, 4.52; N, 24.24.

A–2: Preparation of methyl 3-amino-5-(2,2-pentamethylenehydrazino)-6-chloropyrazinoate A mixture of methyl 3-amino-5,6-dichloropyrazinoate (22.2 g., 0.1 mole), N-aminopiperidine (10.0 g., 0.1 mole), triethylamine (15 ml.), and dimethylsulfoxide (100 ml.) is warmed on the steam bath with stirring for three hours. The solution is diluted with water (350 ml.) and the solid that separates is collected and dried yielding 25.6 g. of methyl 3-amino-5-(2,2-pentamethylenehydrazino)-6-chloropyrazinoate, M.P. 195–202° C. Recrystallization from acetonitrile or butyl chloride gives material with M.P. 207–209° C.

Analysis.—Calc'd for $C_{11}H_{16}ClN_5O_2$ (percent): C, 46.24; H, 5.65; N, 24.51. Found (percent): C, 46.39; H, 5.63; N, 24.73.

A–3: Preparation of methyl 3-amino-5-[2-(2-pyridyl)-hydrazino]-6-chloropyrazinoate.—A mixture of methyl 3-amino-5,6-dichloropyrazinoate (22.2 g., 0.10 mole), 2-hydrazinopyridine (11.0 g., 0.10 mole) triethylamine (22 ml.), and dimethyl sulfoxide (100 ml.) is heated on the steam bath for three and one-half hours. The reaction mixture is diluted with water (250 ml.) and the solid that forms is collected and dried, yielding 29.8 g. of methyl 3-amino - 5 - [2-(2-pyridyl)hydrazino]-6-chloropyrazinoate, M.P. 201–205° C. Recrystallization from acetonitrile gives material with M.P. 203–206° C.

Analysis.—Calc'd for $C_{11}H_{11}ClN_6O_2$ (percent): C, 44.83; H, 3.76; N, 28.52. Found (percent): C, 44.88; H, 3.79; N, 28.82.

By employing substantially the same method described in A–1, above, but substituting for the dimethylamine, equimolar quantities of the amines identified in Table I there is obtained the corresponding methyl 3-amino-5-substituted-amino-6-chloropyrazinoate products identified in Table I according to Equation A.

TABLE I.—EQUATION A

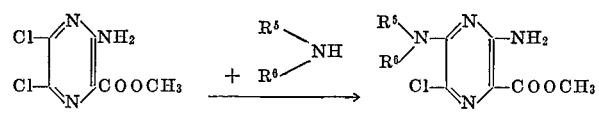

| | | | | Analysis | | | | | |
|---|---|---|---|---|---|---|---|---|---|
| | | | | Calculated | | | Found | | |
| $R^5$ | $R^6$ | M.P., °C. | Product, Formula | C | H | N | C | H | N |

Preparation:

| | $R^5$ | $R^6$ | M.P., °C. | Product, Formula | C | H | N | C | H | N |
|---|---|---|---|---|---|---|---|---|---|---|
| A-4 | $CH{\equiv}C-CH_2-$ | H | 168-169 | $C_9H_9ClN_4O_2$ | 44.92 | 3.77 | 23.28 | 44.82 | 3.73 | 23.09 |
| A-5 | $CH_3OCH_2CH_2-$ | H | 142-144 | $C_9H_{13}N_4O_3Cl$ | 41.47 | 5.03 | 21.49 | 41.56 | 5.03 | 21.38 |
| A-6 | (pyridyl)-$CH_2-$ | H | 190-191 | $C_{12}H_{12}ClN_5O_2$ | 49.07 | 4.12 | 23.85 | 49.39 | 4.06 | 23.88 |
| A-7 | (pyridyl)-$CH_2-$ | H | 170-171 | $C_{12}H_{12}N_5O_2Cl$ | 49.07 | 4.12 | 23.85 | 49.36 | 4.18 | 23.61 |
| A-8 | $CH_3CONH(CH_2)_2-$ | H | 208-210 | $C_{10}H_{14}N_5O_3Cl$ | 41.75 | 4.90 | 42.34 | 42.04 | 4.85 | 24.69 |
| A-9 | $CH_3-N-(CH_2)_2-$ | H | 175-179 | $C_{11}H_{16}ClN_5O_3$ | | | | | | |
| A-10 | $CH_3CONH(CH_2)_3-$ | H | 180-182 | $C_{11}H_{16}N_5O_3Cl$ | 43.78 | 5.35 | | 44.21 | 5.07 | |
| A-11 | $(CH_5)_2NCH_2CH_2-$ | H | 114-116 | $C_{12}H_{20}N_5O_2Cl$ | 47.76 | 6.68 | 23.21 | 47.88 | 6.63 | 23.13 |
| A-12 | $(C_2H_5)_2N(CH_2)_2-$ | $CH_3-$ | 51-54 | $C_{13}H_{22}ClN_5O_2$ | 49.44 | 7.02 | 22.18 | 49.65 | 6.67 | 22.30 |
| A-13 | $(CH_3)_2N-(CH_2)_3-$ | H | 108-109 | $C_{11}H_{18}N_5O_2Cl$ | 45.91 | 6.30 | 24.34 | 46.30 | 6.26 | 24.43 |
| A-14 | $(CH_3)_2N(CH_2)_4-$ | H | 170-171 | $C_{12}H_{20}ClN_5O_2$·HCl | 42.61 | 6.20 | | 42.40 | 5.67 | |
| A-15 | piperidino-$(CH_2)_2-$ | H | 121-122 | $C_{12}H_{18}N_5O_2Cl$ | 48.08 | 6.05 | 23.37 | 48.31 | 6.40 | 23.76 |
| A-16 | $CH_3N$-piperazinyl-$(CH_2)_3-$ | H | 148-149 | $C_{14}H_{23}N_6O_2Cl$ | 49.05 | 6.76 | 24.52 | 48.95 | 6.64 | 24.50 |
| A-17 | morpholino-$(CH_2)_3-$ | H | 158-160 | $C_{13}H_{20}N_5O_3Cl$ | 47.34 | 6.11 | 21.24 | 47.41 | 6.04 | 5.17 |
| A-18 | $CH_3(CH_2)_2-$ | $CH_3$ | 83-85 | $C_{10}H_{15}N_4ClO_2$ | 46.42 | 5.84 | 21.66 | 46.55 | 5.75 | 21.70 |
| A-19 | $-CH_2CH_2-N(C_2H_5)-CH_2CH_2-$ | | 143-145 | $C_{12}H_{18}N_5O_2Cl$ | 48.08 | 6.05 | 23.36 | 47.97 | 6.11 | 23.19 |
| A-20 | $-CH-CH_2-O-CH_2CH_2-$ | | 197-198 | $C_{10}H_{13}N_4O_3Cl$ | 44.04 | 4.80 | 20.55 | 44.32 | 4.74 | 20.67 |
| A-21 | $CH_3,n-C_4H_9{>}N(CH_2)_2-$ | H | 157-158 | $C_{17}H_{26}ClN_5O_6$ (maleate) | 47.28 | 6.07 | 16.22 | 47.43 | 6.06 | 16.55 |
| A-22 | $(CH_3)_2N(CH_2)_3-$ | $CH_3-$ | 202-203 | $C_{12}H_{20}ClN_5O_2$ (HCl) | 42.61 | 6.26 | 20.71 | 42.51 | 6.09 | 21.02 |

The following compounds also are prepared by the method described in A-1, above, by replacing the dimethylamine with an equimolecular quantity of (A-23) 2-(N-acetyl-N-ethylamino)ethylamine
(A-24) 2-piperidinoethylamine
(A-25) 3-piperidinopropylamine thereby forming A-23 Methyl 3-amino-5-[2-(N-acetyl-N-ethylamino)ethylamino]-6-chloropyrazinoate
A-24 Methyl 3-amino-5-(2-piperidinoethylamino)-6-chloropyrazinoate and
A-25 Methyl 3-amino-5-(3-piperidinopropylamino)-6-chloropyrazinoate

SECTION B

Preparation of 3-amino-5-X-6-Y-pyrazinoic acid hydrazides

B-1: 3-amino-5-diethylamino-6-chloropyrazinoic acid hydrazide.—Hydrazine (20 ml. of 64% aqueous solution) is added to a solution of methyl 3-amino-5-diethylamino-6-chloropyrazinoate, 10.0 g., 0.04 mole) in ethanol (250 ml.) and the reaction mixture is refluxed for 4 hours. The solvent is then removed in vacuo and the residue washed out with water and dried to yield 9.0 g. (87%) of 3 - amino-5-diethylamino-6-chloropyrazinoic acid hydrazide melting at 137–140° C. After crystallization from 2-propanol the compound melts at 142–145° C.

Analysis.—Calc'd for $C_9H_{15}N_6ClO$ (percent): C, 41.79; H, 5.84; N, 32.49. Found (percent): C, 42.00; H, 6.05; N, 32.10.

B-2: Preparation of 3-amino-5-(2,2 - pentamethylenehydrazino)-6-chloropyrazinoic acid hydrazide.—A mixture of methyl 3-amino - 5 - (2,2 - pentamethylene-hydrazino)-6-chloropyrazinoate (2.86 g., 0.01 mole), hydrazine (95%, 0.68 g.), dimethylformamide (5. ml.), and ethanol (30 ml.) is heated on the steam bath with stirring for 5 hours then cooled to room temperature. The white solid is collected, washed with a little ethanol, and dried to yield 1.97 g. of 3-amino-5-(2,2-pentamethylenehydrazino)-6-chloropyrazinoic acid hydrazide, M.P. 218–221° C. Recrystallization from ethanol gives material melting at 221–222° C.

Analysis.—Calc'd for $C_{10}H_{16}ClN_7$ (percent): C, 42.03; H, 5.64; N, 34.22. Found (percent): C, 42.01; H, 5.71; N, 34.38.

B-3: Preparation of 3 - amino - 5 - [2 - (2-pyridyl) hydrazinol]-6-chloropyrazinoic acid hydrazide.—A mixture of methyl 3-amino-5-[2 - (2 - pyridyl)-hydrazinol] 6-chloropyrazinoate (11.75 g., 0.04 mole), hydrazine (64% in water, 50 ml.), and ethanol (175 ml.) is heated to reflux for four hours. The mixture is diluted with water (100 ml.) and the solid collected and dried at 70° C., yielding 11.52 g. of 3-amino-5-[2-(2 - pyridyl)-hydrazino]-6-chloropyrazinoic acid hydrazide, M.P. 229–232° C. (dec.). Recrystallization from 50% aqueous dimethylformamide gives material with M.P. 230–233° C. (dec.).

*Analysis.*—Calcd. for $C_{10}H_{11}ClN_8O$ (percent): C, 40.75; H, 3.76; N, 38.03. Found (percent): C, 40.90; H, 3.73; N, 38.34.

By employing substantially the method described in B-1, above, but substituting for methyl 3-amino-5-diethylamino-6-chloropyrazinoate equimolar quantities of the methyl pyrazinoates identified in Table II there is produced the corresponding pyrazinoic acid hydrazides, [also identified in Table II, for each of which physical constants are provided under "End Products"] according to Equation B.

TABLE II.—EQUATION B

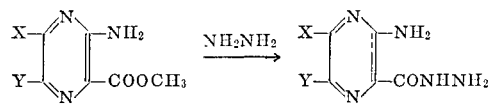

| | | | | End product | | | | | | | |
|---|---|---|---|---|---|---|---|---|---|---|---|
| | | | | | | | Analysis | | | | |
| | | | | | | | Calculated | | | Found | | |
| Preparation | Ester① from prepn. | X | Y | M.P., °C. | Formula | C | H | N | C | H | N |
| B-4 | | $NH_2$— | Cl | 260-1 | $C_5H_7ClN_6O$ | 29.64 | 3.48 | 41.48 | 30.18 | 3.44 | 41.61 |
| B-5 | | $CH_3NH$— | Cl | 257-60 | Compound not purified | | | | | | |
| B-6 | | $C_2H_5NH$— | Cl | 168-70 | $C_7H_{11}N_6ClO$ | 36.45 | 4.80 | 36.44 | 36.71 | 4.87 | 36.71 |
| B-7 | | n-$C_3H_7NH$— | Cl | 171-3 | $C_8H_{13}N_6ClO$ | 39.27 | 5.35 | 34.35 | 39.33 | 5.38 | 34.46 |
| B-8 | | $CH_2=CHCH_2NH$— | Cl | 158-60 | $C_8H_{11}N_6ClO$ | 39.59 | 4.57 | 34.63 | 39.66 | 4.77 | 34.65 |
| B-9 | | n-$C_4H_9NH$— | Cl | 162-5 | $C_9H_{15}N_6ClO$ | 41.78 | 5.84 | 32.49 | 42.10 | 6.01 | 32.63 |
| B-10 | | $(CH_3)_2CHNH$— | Cl | 132-4 | $C_8H_{13}N_6ClO$ | 39.27 | 5.36 | 34.35 | 39.00 | 5.50 | 34.35 |
| B-11 | | $(CH_3)_3C-NH$— | Cl | 192-3 | $C_9H_{15}ClN_6O$ | 41.78 | 5.84 | 32.49 | 41.44 | 5.65 | 32.47 |
| B-12 | | cyclopentyl-NH— | Cl | 143-5 | $C_{10}H_{15}N_6ClO$ | 44.36 | 5.58 | 31.05 | 44.52 | 5.71 | 30.85 |
| B-13 | A-9 | $CH_3N(COCH_3)-(CH_2)_2NH$— | Cl | 161-2 | $C_{19}A_{16}ClN_7O_2$ | 39.80 | 5.35 | 32.50 | 40.17 | 5.17 | 32.25 |
| B-14 | A-5 | $CH_3OCH_2CH_2NH$— | Cl | 151-3 | $C_8H_{11}ClN_6O_2$ | 36.86 | 5.03 | 32.24 | 36.92 | 4.83 | 32.18 |
| B-15 | | Cl-$C_6H_4$-$CH_2NH$— | Cl | 158-60 | $C_{12}H_{12}N_6ClO$ | 44.05 | 3.70 | 25.69 | 43.86 | 3.75 | 25.61 |
| B-16 | A-6 | 2-pyridyl-$CH_2NH$— | Cl | 213-4 | $C_{11}H_{12}ClN_7O$ | 44.98 | 4.12 | 33.38 | 45.27 | 4.03 | 33.62 |
| B-17 | A-7 | 3-pyridyl-$CH_2NH$— | Cl | 191-2 | $C_{11}H_{12}ClN_7O$ | 44.98 | 4.12 | 33.38 | 45.33 | 4.39 | 33.68 |
| B-18 | | 4-pyridyl-$CH_2NH$— | Cl | 208-10 | $C_{11}H_{12}ClN_7O$ | 44.98 | 4.12 | 33.38 | 45.34 | 4.24 | 33.70 |
| B-19 | A-8 | $CH_3C(O)-NH(CH_2)_2NH$— | Cl | 245-8 | $C_9H_{14}ClN_7O_2$ | 37.57 | 4.90 | 34.08 | 37.77 | 4.93 | 34.37 |
| B-20 | A-12 | $(C_2H_5)_2N(CH_2)_2N(CH_3)$— | Cl | 116-117 | $C_{12}H_{22}ClN_7$ | 45.63 | 7.02 | 31.05 | 45.42 | 6.77 | 31.36 |
| B-21 | A-10 | $CH_3CONH(CH_2)_3NH$— | Cl | 220-1 | $C_{10}H_{16}ClN_7O$ | 39.80 | 5.35 | 32.50 | 40.06 | 5.37 | 32.40 |
| B-22 | | $(CH_3)_2N-CH_2CH_2NH$— | Cl | 161-3 | $C_9H_{16}N_7ClO$ | 39.49 | 5.89 | 35.82 | 39.86 | 5.94 | 36.04 |
| B-23 | A-11 | $(C_2H_5)_2N(CH_2)_2NH$— | Cl | 95-7 | Compound not purified | | | | | | |
| B-24 | A-22 | $(CH_3)_2N(CH_2)_3N(CH_3)$— | Cl | 77-88 | $C_{11}H_{20}ClN_7O$ | 43.78 | 6.68 | 32.49 | 43.94 | 6.50 | 32.45 |
| B-25 | A-13 | $(CH_3)_2N(CH_2)_3NH$— | Cl | 152-4 | $C_{10}H_{18}ClN_7O$ | 41.74 | 6.30 | 34.08 | 41.90 | 6.41 | 34.46 |
| B-26 | A-14 | $(CH_3)_2N(CH_2)_4NH$— | Cl | 113-5 | $C_{11}H_{20}ClN_7O$ | 43.78 | 6.63 | 32.49 | 44.13 | 6.48 | 33.03 |
| B-27 | A-15 | pyrrolidinyl-$CH_2CH_2NH$ | Cl | 120-1 | $C_{11}H_{18}ClN_7O$ | 44.07 | 6.07 | 32.71 | 44.03 | 5.97 | 32.92 |
| B-28 | A-16 | $CH_3-N(piperazinyl)-(CH_2)_3NH$— | Cl | 167-9 | $C_{13}H_{23}ClN_8O$ | 45.54 | 6.76 | 32.69 | 45.50 | 6.73 | 32.48 |

TABLE II.—Continued

| Preparation | Ester from prepn.[1] | X | Y | M.P., °C. | Formula | Calculated C | Calculated H | Calculated N | Found C | Found H | Found N |
|---|---|---|---|---|---|---|---|---|---|---|---|
| B-29 | A-17 | O⟨ ⟩N—(CH₂)₃NH— | Cl | 183-4 | C₁₂H₂₀ClN₇O₂ | 43.70 | 6.11 | 29.73 | 44.24 | 6.17 | 29.00 |
| B-30 | | ⟨phenyl⟩—NH— | Cl | 194-5 | C₁₁H₁₁ClN₆O | 47.40 | 3.98 | 30.16 | 47.39 | 4.02 | 30.32 |
| B-31 | A-1 | (CH₃)₂N— | Cl | 193-5 | C₇H₁₁ClN₆O | 36.45 | 4.81 | 36.44 | 36.51 | 5.01 | 36.84 |
| B-32 | | CH₃(CH₃)N— | ⟨phenyl⟩— | 153-4 | C₁₃H₁₆N₆O | 57.34 | 5.92 | 30.86 | 57.77 | 5.81 | 30.71 |
| B-33 | | CH₃(C₂H₅)N— | Cl | 134-6 | C₈H₁₃N₆ClO | 39.27 | 5.36 | 34.35 | 39.36 | 5.51 | 34.39 |
| B-34 | A-18 | CH₃(C₃H₇)N— | Cl | 133-6 | C₉H₁₅ClN₆O | 41.78 | 5.84 | 32.49 | 41.92 | 5.84 | 32.31 |
| B-35 | A-21 | CH₃(n-C₄H₉)N(CH₂)₂NH— | Cl | 88 | C₁₂H₂₂ClN₇O | 45.63 | 7.02 | 31.05 | 45.72 | 6.73 | 31.43 |
| B-36 | | ⟨pyrrolidinyl⟩N— | Cl | 181-2 | C₉H₁₃ClN₆O | 42.11 | 5.10 | 32.74 | 42.45 | 5.06 | 32.86 |
| B-37 | | CH₃—N⟨ ⟩N— | Cl | 189-90 | C₁₀H₁₆ClN₇O | 27.59 | 3.71 | — | 28.11 | 3.62 | — |
| B-38 | A-19 | C₂H₅N⟨ ⟩N— | Cl | 168-70 | C₁₁H₁₈ClN₇O | 44.07 | 6.05 | — | 44.20 | 5.66 | — |
| B-39 | A-20 | O⟨ ⟩N— | Cl | 190-92 | C₉H₁₃ClN₆O | 39.64 | 4.80 | 30.82 | 39.43 | 4.57 | 30.64 |

| Preparation | Ester from Prepn.[1] | X | Y |
|---|---|---|---|
| B-40 | | H₂N— | Br |
| B-41 | | H₂N— | I |
| B-42 | | ⟨cyclopropyl⟩—NH— | Cl |
| B-43 | A-4 | CH≡CCH₂NH— | Cl |
| B-44 | | ⟨cyclopropyl⟩—CH₂NH— | Cl |
| B-45 | | CH₃(CH₃O)N— | Cl |
| B-46 | | CF₃CH₂NH— | C |
| B-47 | | CF₃CH₂CH₂NH— | C |
| B-48 | | CH₃—⟨phenyl⟩—CH₂NH— | Cl |
| B-49 | | ⟨phenyl⟩—CH₂CH₂NH— | Cl |
| B-50 | | ⟨furyl⟩—CH₂NH— | Cl |
| B-51 | A-23 | C₂H₅N(CH₂)₂NH—, COCH₃ | Cl |
| B-52 | A-24 | ⟨piperidinyl⟩N—(CH₂)₂NH— | Cl |
| B-53 | A-25 | ⟨piperidinyl⟩N—(CH₂)₃NH— | Cl |
| B-54 | | Cl—⟨phenyl⟩—NH— | Cl |
| B-55 | | (CH₃)₂N— | CH₃ |
| B-56 | | CH₃(CH₂=CH—CH₂)N— | Cl |
| B-57 | | CH₃(n-C₄H₉)N— | Cl |

[1] Ester known unless otherwise noted.

SECTION C

Preparation of 1-(3-amino-5-X-6-Y-pyrazinoyl)semicarbazides

NOTE.—The hydrazide intermediate is known unless otherwise noted.

EXAMPLE 1

1-(3-amino-6-chloropyrazinoyl)-4-phenylsemicarbazide

To a boiling mixture of 3-amino-6-chloropyrazinoic acid hydrazide (3.76 g.; 0.02 mole) in acetonitrile (125 ml.) is added phenyl isocyanate (2.38 g.; 0.02 mole). The reaction mixture is heated at reflux for one hour and then allowed to stand at room temperature overnight. The solid product that precipitates is collected giving 6.0 g. (97%) of 1 - (3-amino-6-chloropyrazinoyl)-4-phenylsemicarbazide, M.P. 220° C. After recrystallization from a mixture of acetic acid and ethyl alcohol the product melts at 215–217° C.

*Analysis.*—Calcd. for $C_{12}R_{11}ClN_6O_2$ (percent): C, 46.99; H, 3.62. Found (percent): C, 47.06; H, 3.55.

EXAMPLE 2

1-(3-amino-6-chloropyrazinoyl)semicarbazide

A mixture of 3-amino-6-chloropyrazinoic acid hydrazide (5.00 g.; 0.027 mole) and potassium cyanate (4.38 g., 0.054 mole) in 50 ml. of water and 5 ml. of concentrated hydrochloric acid is heated on the steam bath for two hours. The reaction mixture is cooled to room temperature in an ice bath. The solid that separates is collected and dried to give 5.20 g. (85%) of 1-(3-amino-6-chloropyrazinoyl)semicarbazide, M.P. 235–248° C. (dec). Recrystallization from absolute ethanol gives material melting at 249–251° C. (dec.).

*Analysis.*—Calcd. for $C_6H_7ClN_6O_2$ (percent): C, 31.24; H, 3.06; N, 36.44. Found (percent): C, 31.55; H, 3.29; N, 36.50.

EXAMPLE 3

1-(3,5-diamino-6-chloropyrazinoyl)semicarbazide dimethylformamide solvate

A mixture of 3,5-diamino-6-chloropyrazinoic acid hydrazide (5.00 g., 0.025 mole), from preparation B-4, and potassium cyanate (4.06 g., 0.050 mole) in 50 ml. of water and 5 ml. of concentrated hydrochloric acid is heated on a steam bath for two hours. The reaction mixture is cooled in an ice bath and the solid that separates is collected and dried. Recrystallization from dimethylformamide gives 1-(3,5-diamino-6-chloropyrazinoyl)semicarbazide dimethylformamide solvate, in the form of a light orange colored solid, yielded 5.0 g. (92%), M.P.>300° C.

*Analysis.*—Calcd. for $C_6H_8ClN_7O_2$ ($+C_3H_7NO$) (percent): C, 33.91; H, 4.74; N, 35.16. Found (percent): C, 33.70; H, 4.55; N, 35.05.

EXAMPLE 4

1-(3,5-diamino-6-chloropyrazinoyl)-4-allylsemicarbazide

A mixture of 3,5-diamino-6-chloropyrazinoic acid hydrazide (5.00 g., 0.025 mole), from preparation B-4, and allyl isocyanate in pyridine (100 ml.) is heated on a steam bath for two hours. The resulting solution is diluted with water (250 ml.) and allowed to stand in an ice bath whereupon a yellow solid separates out of solution. This solid is collected by filtration and dried yielding 2.6 g. (46%) of 1 - (3,5-diamino-6-chloropyrazinoyl)-4-allyl-semicarbazide, M.P. grad. dec. over 200° C. Recrystallization from nitromethane yields material that gradually decomposes above 200° C.

*Analysis.*—Calcd. for $C_9H_{12}ClN_7O_2$ (percent): C, 37.83; H, 4.24; N, 34.32. Found (percent): C, 37.97; H, 4.48; N, 34.58.

Additional 1-(3-aminopyrazinoyl)semicarbazide compounds prepared by the process described in Example 1 are identified in Table III. These products are prepared by reacting equimolecular quantities of the 3-aminopyrazinoic acid hydrazide II, having the substituents X and Y identified in the table with the isocyanate III-a, having the substituent $R^1$ identified in the table to give the product I-a, having the substituent X, Y, and $R^1$ given in Table III.

TABLE III $$X\text{-pyrazine-}NH,\ CONHNH_2\ (II) \quad \xrightarrow{O=C=NR^1\ (III\text{-}a)} \quad X\text{-pyrazine-}NH,\ CONHNH-\overset{O}{\underset{\|}{C}}-NHR^1\ (I\text{-}a)$$

| Example No. | Hydrazide from Prepn.[1] | X | Y | $R^1$ |
|---|---|---|---|---|
| 5 | | H | Cl | $-CH_2CH=CH_2$ |
| 6 | B-1 | $(C_2H_5)_2N-$ | Cl | $-CH_2CH=CH_2$ |
| 7 | B-2 | piperidino-N-NH- | Cl | -C₆H₄-Cl |
| 8 | B-3 | pyridyl-NHNH- | Cl | $-CH_2-C_6H_5$ |
| 9 | B-5 | $CH_3NH-$ | Cl | $-CH_2CH=CH_2$ |
| 10 | B-6 | $C_2H_5NH-$ | Cl | $-CH_3$ |
| 11 | B-7 | $n\text{-}C_3H_7NH-$ | Cl | $-C_3H_7\text{-}n$ |
| 12 | B-8 | $CH_2=CHCH_2NH-$ | Cl | $-CH_2-CH=CH_2$ |
| 13 | B-9 | $n\text{-}C_4H_9NH-$ | Cl | $-C_4H_9\text{-}n$ |
| 14 | B-10 | $(CH_3)_2CHNH-$ | Cl | $-CH_3$ |
| 15 | B-11 | $(CH_3)_3C-NH-$ | Cl | $-CH_2CH=CH_2$ |
| 16 | B-12 | cyclopentyl-NH- | Cl | $-CH_2CH=CH_2$ |
| 17 | | H | I | $-CH_2CH=CH_2$ |
| 18 | B-14 | $CH_3OCH_2CH_2NH-$ | Cl | $-CH_2CH=CH_2$ |
| 19 | B-15 | $Cl\text{-}C_6H_4\text{-}CH_2NH-$ | Cl | $-CH_2CH=CH_2$ |

TABLE III.—Continued

| Example No.: | Hydrazide from Prepn.[1] | X | Y | R[1] |
|---|---|---|---|---|
| 20 | B-16 | pyridin-2-yl-CH$_2$NH— | Cl | —CH$_2$CH=CH$_2$ |
| 21 | B-17 | pyridin-3-yl-CH$_2$NH— | Cl | —CH$_2$CH=CH$_2$ |
| 22 | B-18 | pyridine-N-oxide-CH$_2$NH— | Cl | —CH$_2$—C$_6$H$_5$ |
| 23 | B-19 | CH$_3$C(=O)—NH(CH$_2$)$_2$NH— | Cl | —C$_4$H$_9$-n |
| 24 | B-45 | CH$_3$(CH$_3$O)N— | Cl | —CH$_2$—C$_6$H$_5$ |
| 25 | B-21 | CH$_3$CONH(CH$_2$)$_3$NH— | Cl | —CH$_2$CH=CH$_2$ |
| 26 | B-22 | (CH$_3$)$_2$N(CH$_2$)$_2$NH— | Cl | —(CH$_2$)$_2$—C$_6$H$_5$ |
| 27 | B-23 | (C$_2$H$_5$)$_2$N(CH$_2$)$_2$NH— | Cl | —CH$_2$CH=CH$_2$ |
| 28 | B-57 | CH$_3$(n-C$_4$H$_9$)N— | Cl | —CH$_3$ |
| 29 | B-25 | (CH$_3$)$_2$N(CH$_2$)$_3$NH— | Cl | —CH$_2$CH=CH$_2$ |
| 30 | B-26 | (CH$_3$)$_2$N(CH$_2$)$_4$NH— | Cl | H |
| 31 | B-27 | pyrrolidin-1-yl-CH$_2$CH$_2$NH— | Cl | —CH$_2$—C$_6$H$_5$ |
| 32 | B-28 | CH$_3$—N(piperazine)N—(CH$_2$)$_3$NH— | Cl | —CH$_2$CH=CH$_2$ |
| 33 | B-29 | morpholino-(CH$_2$)$_3$NH— | Cl | —CH$_2$CH=CH$_2$ |
| 34 | B-30 | C$_6$H$_5$—NH— | Cl | —C$_6$H$_4$—Cl |
| 35 | B-31 | (CH$_3$)$_2$N— | Cl | —CH$_2$CH=CH$_2$ |
| 36 | B-32 | (CH$_3$)$_2$N— | —C$_6$H$_5$ | —CH$_2$CH=CH$_2$ |
| 37 | B-33 | CH$_3$(C$_2$H$_5$)N— | Cl | —CH$_2$CH=CH$_2$ |
| 38 | B-34 | CH$_3$(C$_3$H$_7$)N— | Cl | —CH$_2$CH=CH$_2$ |
| 39 | B-56 | CH$_3$(CH$_2$=CH—CH$_2$)N— | Cl | —CH$_2$CH=CH$_2$ |
| 40 | B-36 | pyrrolidin-1-yl— | Cl | —CH$_2$CH=CH$_2$ |
| 41 | B-37 | CH$_3$—N(piperazin-1-yl)— | Cl | —CH$_2$CH=CH$_2$ |
| 42 | B-38 | C$_2$H$_5$N(piperazin-1-yl)— | Cl | —CH$_2$CH=CH$_2$ |
| 43 | B-39 | morpholin-4-yl— | Cl | —CH$_2$CH=CH$_2$ |
| 44 | B-35 | CH$_3$(n-C$_4$H$_9$)N(CH$_2$)$_2$NH— | Cl | —C$_6$H$_5$ |
| 45 | B-24 | (CH$_3$)$_2$N(CH$_2$)$_3$N(CH$_3$)— | Cl | H |

TABLE III.—Continued

| Example No.: | Hydrazide from Prepn.[1] | X | Y | R¹ |
|---|---|---|---|---|
| 46 | B-20 | (C₂H₅)₂N(CH₂)₂N(CH₃)— | Cl | —CH₂CH=CH₂ |
| 47 | B-55 | (CH₃)₂N— | —CH₃ | —CH₃ |
| 48 | B-13 | CH₃N(COCH₃)—(CH₂)₂NH— | Cl | —CH₃ |
| 49 | B-40 | H₂N— | Br | —CH₂CH=CH₂ |
| 50 | B-41 | H₂N— | I | —CH₂CH=CH₂ |
| 51 | B-42 | cyclopropyl-NH— | Cl | —CH₃ |
| 52 | B-43 | CH≡CCH₂NH— | Cl | —CH₃ |
| 53 | B-44 | cyclopropyl-CH₂NH— | Cl | —CH₃ |
| 54 | B-54 | Cl-C₆H₄-NH— | Cl | —CH₂—C₆H₅ |
| 55 | B-46 | CF₃CH₂NH— | Cl | —C₆H₄—Cl |
| 56 | B-47 | CF₃CH₂CH₂NH— | Cl | —CH₂CH=CH₂ |
| 57 | B-48 | CH₃—C₆H₄—CH₂NH— | Cl | —CH₂CH=CH₂ |
| 58 | B-49 | C₆H₅—CH₂CH₂NH— | Cl | —(H₂C)₂—C₆H₅ |
| 59 | B-50 | furfuryl(2-furyl-CH₂NH—) | Cl | —CH₂CH=CH₂ |
| 60 | B-51 | C₂H₅N(COCH₃)(CH₂)₂NH— | Cl | —C₂H₅ |
| 61 | B-52 | piperidino-(CH₂)₂NH— | Cl | —C₃H₇-n |
| 62 | B-53 | piperidino-(CH₂)₃NH— | Cl | —C₃H₇-n |

[1] Hydrazide known unless otherwise noted.

SECTION D

Preparation of 1-(3-amino-5-X-6-Y-pyrazinoyl)-thiosemicarbazides

Note.—The hydrazide intermediate is known unless otherwise noted.

EXAMPLE 63

1-(3,5-diamino-6-chloropyrazinoyl)thiosemicarbazide

A mixture of 3,5-diamino-6-chloropyrazinoic acid hydrazide, from Preparation B–4, (6.06 g.; 0.03 mole) and potassium thiocyanate (3.3 g.; 0.034 mole) in glacial acetic acid (120 ml.) is heated on the steam bath for two hours. The reaction mixture is cooled to room temperature and the solid removed by filtration. The solid material is dissolved in hot dimethylformamide (20 ml.) and reprecipitated by addition of water to give 2.19 g. of 1-(3,5 - diamino - 6 - chloropyrazinoyl)thiosemicarbazide, M.P. 241.5–243° C. (dec.). After recrystallization from a mixture of dimethylformamide and water, the material melts at 242.5–244° C. (dec.).

*Analysis.*—Calcd. for $C_1H_{107}ClN_8OS$ (percent): C, 27.53; H, 3.08; N, 37.47. Found (percent): C, 27.74; H, 2.88; N, 37.61.

EXAMPLE 64

1[3-amino-5-(2-dimethylaminoethylamino)-6-chloropyrazinoyl]thiosemicarbazide 3-amino-5-(2 - dimethylaminoethylamino) - 6 - chloropyrazinoic acid hydrazide (10.92 g.; 0.04 mole), from Preparation B–22, and potassium thiocyanate (7.76 g.; 0.08 mole) are mixed with N hydrochloric acid (75 ml.) and refluxed for 3 hours. The solution is cooled and allowed to stand overnight. Water (100 ml.) is added and the solid that forms is collected by filtration. The yellow solid obtained is dissolved in hot water (200 ml.) treated with decolorizing charcoal, filtered and the filtrate made alkaline by addition of 6 N ammonium hydroxide (10 ml.). The yellow solid that precipitates is collected and dried to give 7.38 g. of 1-[3-amino-5-(2-dimethylaminoethylamino) - 6 - chloropyrazinoyl]thiosemicarbazide, M.P. 201° C. Recrystallization from nitromethane gives material melting at 202–203° C. (dec.).

Analysis.—Calcd. for $C_{10}H_{17}ClN_8OS$ (percent): C, 36.08; H, 5.08; N, 33.99. Found (percent): C, 36.43; H, 5.00; N, 33.23.

EXAMPLE 65

1-(3,5-diamino-6-chloropyrazinoyl)-4-allylthiosemicarbazide 3,5-diamino-6-chloropyrazinoic acid hydrazide (6.0 g.; 0.03 mole), from Preparation B-4, and allyl isothiocyanate (4.95 g.; 0.05 mole) are mixed with glacial acetic acid (120 ml.) and warmed on the steam bath for two hours. The reaction mixture is diluted with water (250 ml.), and chilled in an ice bath. The solid that separates is collected by filtration and dried to give 7.10 g. (79%) of 1-(3,5 - diamino - 6 - chloropyrazinoyl) - 4 - allylthiosemicarbazide, M.P. 210-212° C. (dec.). Recrystallization from acetonitrile gives material melting at 213-215° C. (dec.).

Analysis.—Calcd. for $C_9H_{12}ClN_7OS$ (percent): C, 35.82; H, 4.01; N, 32.49. Found (percent): C, 35.86; H, 4.35; N, 32.46.

EXAMPLE 66

1-(3-amino-6-chloropyrazinoyl)-4-allylthiosemicarbazide

A refluxing solution of 3-amino-6-chloropyrazinoic acid hydrazide (21.41 g.; 0.15 mole) in 2-methoxyethanol (225 ml.) is treated with allyl isothiocyanate (17.85 g.; 0.18 mole) and refluxing is continued for two hours. The reaction mixture then is concentrated to a paste under reduced pressure and the residue is triturated with ethanol to give 26.28 g. (61%) of 1-(3-amino-6-chloropyrazinoyl) - 4 - allylthiosemicarbazide, M.P. 203-205° C. Recrystallization from acetic acid gives the product in the form of orange prisms, M.P. 208-209° C.

Analysis.—Calcd. for $C_9H_{11}ClN_6OS$ (percent): C, 37.70; H, 3.87; N, 29.31. Found (percent): C, 38.02; H, 3.80; N, 29.37.

EXAMPLE 67

1-(3-amino-6-chloropyrazinoyl)thiosemicarbazide

A solution of 3-amino-6-chloropyrazinoic acid hydrazide (3.8 g.; 0.02 mole) and potassium thiocyanate (2.4 g.; 0.024 mole) in acetic acid (40 ml.) is heated one hour on the steam bath. The crystalline product that separates is collected on a filter and recrystallized from a mixture of isopropyl alcohol and water to give 1.7 g. (68%) of 1-(3 - amino - 6 - chloropyrazinoyl)thiosemicarbazide, M.P. 236-237° C. (dec.).

Analysis.—Calcd. for $C_6H_7ClN_6OS$ (percent): C, 29.21; H, 2.86; N, 34.07. Found (percent): C, 29.55; H, 3.03; N, 34.30.

EXAMPLE 68

1-(3,5-diamino-6-chloropyrazinoyl)-4-phenylthiosemicarbazide

A mixture of 3,5-diamino-6-chloropyrazinoic acid hydrazide (6.06 g.; 0.03 mole), from Preparation B-4, and phenyl isothiocyanate (6.0 ml.) in glacial acetic acid (120 ml.) is heated on the steam bath for one hour, cooled and diluted slowly with water (250 ml.) and set aside overnight. The solid that forms is collected and dried to give 6.4 g. (63%) of 1-(3,5-diamino-6-chloropyrazinoyl)-4-phenylthiosemicarbazide, M.P., depending upon the rate of heating, 206-208° C. (fast heating); 223-224° C. (slow heating), both with decomposition. Recrystallization from aqueous isopropyl alcohol gives material melting at 207-208.5° C. (fast heating); 224-226° C. (slow heating), both with decomposition.

Analysis.—Calcd. for $C_{12}H_{12}ClN_7OS$ (percent): C, 42.66; H, 3.58. Found (percent): C, 43.14; H, 3.64.

The above reaction when carried out in the presence of pyridine as a solvent gives material identical with that obtained in Example 68.

EXAMPLE 69

1-{3-amino-5-[2-(2-pyridyl)hydrazino]-6-chloropyrazinoyl}thiosemicarbazide 3-amino-5-[2 - (2 - pyridyl)hydrazino]-6-chloropyrazinoic acid hydrazide (3.4 g.; 0.0115 mole), from Preparation B-3, and potassium thiocyanate (2.23 g.; 0.023 mole) are mixed with N hydrochloric acid (75 ml.) and heated to reflux three hours. The resulting clear yellow solution is cooled and allowed to stand overnight. The solid that separates is collected and dried to give 1.70 g. (43%) of 1-{3-amino-5 - [2 - (2 - pyridyl)hydrazino]-6-chloropyrazinoyl}thiosemicarbazide, M.P. 226-229° C. (dec.). Recrystallization from dimethylformamide by the addition of acetonitrile gives material melting at 228-231° C. (dec.).

Analysis.—Calcd. for $C_{11}H_{12}ClN_9OS$ (percent): C, 37.34; H, 3.42; N, 35.65. Found (percent): C, 37.13; H, 3.35; N, 35.40.

EXAMPLE 70

1-(3,5-diamino-6-chloropyrazinoyl)-4-methylthiosemicarbazide

A mixture of 3,5-diamino-6-chloropyrazinoic acid hydrazide (6.06 g.; 0.03 mole), from Preparation B-4, and methyl isothiocyanate (3.67 g.; 0.05 mole) in glacial acetic acid (120 ml.) is heated on the steam bath for two methylthiosemicarbazide, M.P. 270-273° C. (dec.). Recrystallization from hot dimethylformamide gives material melting at 271-273° C. (dec.).

Analysis.—Calc. for $C_7H_{10}ClN_7OS$ (percent): C, 30.49; H, 3.66; N, 35.56. Found (percent): C, 30.70; H, 3.91; N, 35.53.

The above reaction when carried out employing pyridine as the solvent gives the same product.

EXAMPLE 71

1-[3-amino-5-(2,2-pentamethylenehydrazine)-6-chloropyrazinoyl]thiosemicarbazide

A solution of 3-amino-5-(2,2-pentamethylenehydrazino)-6-chloropyrazinoic acid hydrazide (5.71 g.; 0.02 mole) from Preparation B-2, and potassium thiocyanate (3.88 g.; 0.04 mole) in N hydrochloric acid (40 ml.) is refluxed for two hours. The clear solution then is diluted with water (100 ml.) and neutralized by the addition of dilute ammonium hydroxide. The solid that separates is collected and dried to give 5.89 g. (85%) of 1-[3-amino-5 - (2,2 - pentamethylenehydrazino)-6-chloropyrazinoyl] thiosemicarbazide, M.P. 230-233° C. (dec.). Recrystallization from nitromethane with a little added dimethylformamide gives material melting at 239.5-242.5° C. (dec.).

Analysis.—Calc. for $C_{11}H_{17}ClN_8OS$ (percent): C, 38.31; H, 4.97; N, 32.50. Found (percent): C, 38.67; H, 5.12; N, 32.55.

EXAMPLE 72

1-{3-amino-5-[2-(2-pyridyl)hydrazino]-6-chloropyrazinoyl}-4-allyl-3-thiosemicarbazide 3-amino-5-[2-(2-pyridyl)hydrazino] - 6-chloropyrazinoic acid hydrazide (6.49 g.; 0.022 mole), from Preparation B-3, and allyl isothiocyanate (3.92 g., 0.044 mole) are mixed with glacial acetic acid (130 ml.), and heated on a steam bath with stirring for two hours. The reaction mixture is diluted with water (500 ml.), and neutralized with dilute aqueous ammonium hydroxide (150 ml.). The yellow solid that separates is collected by filtration and dried, yielding 7.9 g. (91% of 1-{3-amino-5-[2-(2-pyridyl)hydrazino] - 6 - chloropyrazinoyl}-4-allyl-3-thiosemicarbazide, M.P. 218–222° C. Recystallization from dimethylformamide gives material melting at 226–227° C. (dec.).

*Analysis.*—Calc. for $C_{14}H_{16}ClN_9OS$ (percent): C, 42.69; H, 4.10; N, 32.01. Found (percent): C, 42.55; H, 4.07; N, 31.94.

Additional 1 - (3-amino-5-X-6-Y-pyrazinoyl)thiosemicarbazides prepared by substantially the same procedure described in Example 63 are identified in Table IV. The products are prepared by reacting the pyrazinoic acid hydrazide II with the thiocyanate or isothiocyanate III-*b* to give the desired product I-*b* wherein in each of the reactant and end product X, Y and R¹ have the significance given in the following table.

TABLE IV $$\underset{II}{\overset{X \diagdown\hspace{-1pt}\diagup N \diagdown}{\underset{Y \diagdown\hspace{-1pt}\diagup N \diagup}{\phantom{X}}}\begin{matrix}-NH_2\\-CONHNH_2\end{matrix}} \xrightarrow{\underset{III\text{-}b}{S=C=NR^1}} \underset{I\text{-}b}{\overset{X \diagdown\hspace{-1pt}\diagup N \diagdown}{\underset{Y \diagdown\hspace{-1pt}\diagup N \diagup}{\phantom{X}}}\begin{matrix}-NH_2\\-CONHNH-\overset{S}{\underset{\parallel}{C}}-NHR^1\end{matrix}}$$

| Ex. No. | Hydrazide from Prepn.* | X | Y | R¹ |
|---|---|---|---|---|
| 73 | | H | Cl | —CH₂—C₆H₅ |
| 74 | B-1 | (C₂H₅)₂N— | Cl | —CH₂CH=CH₂ |
| 75 | B-5 | CH₃NH— | Cl | —CH₂CH=CH₂ |
| 76 | B-6 | C₂H₅NH— | Cl | —CH₃ |
| 77 | B-7 | n-C₃H₇NH— | Cl | —C₃H₇-n |
| 78 | B-8 | CH₂=CHCH₂NH— | Cl | —CH₂CH=CH₂ |
| 79 | B-9 | n-C₄H₉NH— | Cl | —C₄H₉-n |
| 80 | B-10 | (CH₃)₂CHNH— | Cl | —C₃H₇-n |
| 81 | B-11 | (CH₃)₃C—NH— | Cl | —CH₂CH=CH₂ |
| 82 | B-12 | cyclopentyl-NH— | Cl | —CH₂CH=CH₂ |
| 83 | | H | I | H |
| 84 | B-14 | CH₃OCH₂CH₂NH— | Cl | —CH₂CH=CH₂ |
| 85 | B-15 | Cl—C₆H₄—CH₂NH— | Cl | —CH₂CH=CH₂ |
| 86 | B-16 | (pyridyl)—CH₂NH— | Cl | —CH₂CH=CH₂ |
| 87 | B-17 | (pyridyl)—CH₂NH— | Cl | —CH₂CH=CH₂ |
| 88 | B-18 | (pyridyl)—CH₂NH— | Cl | —C₄H₉-n |
| 89 | B-19 | CH₃C(=O)—NH(CH₂)₂NH— | Cl | —C₄H₉-n |
| 90 | B-45 | CH₃(CH₃O)N— | Cl | —CH₂CH=CH₂ |
| 91 | B-21 | CH₃CONH(CH₂)₃NH— | Cl | —CH₂CH=CH₂ |
| 92 | B-23 | (C₂H₅)₂N(CH₂)₂NH— | Cl | —CH₂CH=CH₂ |
| 93 | B-57 | CH₃(C₄H₉)N— | Cl | —C₄H₉-n |
| 94 | B-25 | (CH₃)₂N(CH₂)₃NH— | Cl | —CH₂CH=CH₂ |
| 95 | B-26 | (CH₃)₂N(CH₂)₄NH— | Cl | —C₄H₉-n |
| 96 | B-27 | (pyrrolidinyl)N—CH₂CH₂NH— | Cl | —C₆H₅ |
| 97 | B-28 | CH₃N(piperazinyl)N—(CH₂)₃NH— | Cl | —CH₂CH=CH₂ |
| 98 | B-29 | O(morpholinyl)N—(CH₂)₃NH— | Cl | —CH₂CH=CH₂ |
| 99 | B-30 | C₆H₅—NH— | Cl | —C₆H₅ |
| 100 | B-31 | (CH₃)₂N— | Cl | —CH₂CH=CH₂ |

TABLE IV.—Continued

| Ex. No. | Hydrazide from Prepn.* | X | Y | R¹ |
|---|---|---|---|---|
| 101 | B-32 | (CH₃)₂N— | —C₆H₅ (phenyl) | —CH₂CH=CH₂ |
| 102 | B-33 | CH₃(C₂H₅)N— | Cl | —CH₂CH=CH₂ |
| 103 | B-34 | CH₃(C₃H₇)N— | Cl | —CH₂CH=CH₂ |
| 104 | B-56 | CH₃(CH₂=CH—CH₂)N— | Cl | —CH₂CH=CH₂ |
| 105 | B-36 | azetidin-1-yl (N-containing 4-ring) | Cl | —CH₂CH=CH₂ |
| 106 | B-37 | 4-methylpiperazin-1-yl (CH₃—N⟨ ⟩N—) | Cl | —CH₂CH=CH₂ |
| 107 | B-38 | 4-ethylpiperazin-1-yl (C₂H₅N⟨ ⟩N—) | Cl | —CH₂CH=CH₂ |
| 108 | B-39 | morpholin-4-yl (O⟨ ⟩N—) | Cl | —CH₂CH=CH₂ |
| 109 | B-35 | CH₃(n-C₄H₉)N(CH₂)₂NH— | Cl | —C₄H₉-n |
| 110 | B-24 | (CH₃)₂N(CH₂)₃N(CH₃)— | Cl | —CH₃ |
| 111 | B-20 | (C₂H₅)₂N(CH₂)₂N(CH₃)— | Cl | —CH₃ |
| 112 | B-55 | (CH₃)₂N— | —CH₃ | —CH₃ |
| 113 | B-13 | CH₃N(COCH₃)—(CH₂)₂NH— | Cl | —CH₃ |
| 114 | B-40 | H₂N— | Br | —CH₂CH=CH₂ |
| 115 | B-41 | H₂N— | I | —CH₂CH=CH₂ |
| 116 | B-42 | cyclopropyl-NH— | Cl | —C₃H₇-n |
| 117 | B-43 | CH≡CCH₂NH— | Cl | —CH₂CH=CH₂ |
| 118 | B-44 | cyclopropyl-CH₂NH— | Cl | H |
| 119 | B-54 | Cl-C₆H₄-NH— | Cl | —(CH₂)₂C₆H₅ |
| 120 | B-46 | CF₃CH₂NH— | Cl | —CH₂—C₆H₅ |
| 121 | B-47 | CF₃CH₂CH₂NH— | Cl | —CH₂CH=CH₂ |
| 122 | B-48 | CH₃-C₆H₄-CH₂NH— | Cl | —CH₂CH=CH₂ |
| 123 | B-49 | C₆H₅-CH₂CH₂NH— | Cl | —CH₂—C₆H₅ |
| 124 | B-50 | furfuryl (O-ring-CH₂NH—) | Cl | —CH₂CH=CH₂ |
| 125 | B-51 | C₂H₅N(COCH₃)(CH₂)₂NH— | Cl | —CH₂CH=CH₂ |

TABLE IV.—Continued

| Ex. No. | Hydrazide from Prepn.* | X | Y | R¹ |
|---|---|---|---|---|
| 126 | B-52 | 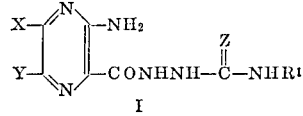N—(CH₂)₂NH— | Cl | —CH₂CH=CH₂ |
| 127 | B-53 | 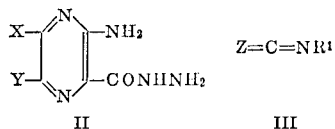N—(CH₂)₃NH— | Cl | —CH₂CH=CH₂ |

* Hydrazide known unless otherwise noted.

The novel compounds of this invention can be formulated in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing, for example, from 5 to 500 mgs. or more or less active ingredients can be made available to the physician for the symptomatic adjustment of the dosage to the individual patient. As each of the compounds of this invention can be incorporated in a dosage form similar to those described in the following examples, or other usual dosage forms suitable for oral or parenteral administration, which can be prepared by well-known methods, the following examples are included herein solely to illustrate the preparation of representative dosage forms.

EXAMPLE 128

Dry-filled capsule containing 500 mgs. of 1-(3-amino-6-chloropyrazinoyl)-4-phenylsemicarbazide

|   | Mgs./capsule |
|---|---|
| Active ingredient | 500 |
| Magnesium stearate | 5 |
| Mixed powders | 505 |

Mix the active ingredient and magnesium stearate and reduce to a No. 60 mesh powder. Encapsulate, filling 505 mgs. in each No. 0 capsule.

EXAMPLE 129

Dry-filled capsule containing 50 mgs. of 1-(3,5-diamino-6-chloropyrazinoyl)-4-allylthiosemicarbazide

|   | Mgs./capsule |
|---|---|
| Active ingredient | 50 |
| Lactose | 273 |
| Magnesium stearate | 2 |
| Mixed powders | 325 |

Mix the active ingredient, lactose and magnesium stearate and reduce to a No. 60 mesh powder. Encapsulate, filling 325 mgs. in each No. 0 capsule.

It is also contemplated to combine compounds of this invention in unit dosage form with other known diuretic agents, such as hydrochlorothiazide, 4'-methyl-6-chlorospiro-[2H-1,2,4-benzothiadiazine-3(4H)-1'-cyclohexane]-7-sulfonamide-1,1-dioxide, trichloromethiazide, cyclopenthiazide, acetazolamide, dichlorophenamide, chlorthalidone, chloromerodrin, chlorazanil, spironolactone, and the like or to combine the compounds of this invention with hypotensive agents or steroids or other desired therapeutic agents in suitable dosage form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific ingredients included in the pharmaceutical preparations, but is to be understood to embrace variations and modifications thereof which fall within the scope of the appended claims.

What is claimed is:

1. A process for the prepartion of a 1-(3-aminopyrazinoyl)-thiosemicarbazide having the structure $$\begin{array}{c} X-\underset{Y}{\overset{N}{\diagdown}}\underset{N}{\diagup}-NH_2 \\ \phantom{X}\underset{}{}-CONHNH-\overset{Z}{\underset{\|}{C}}-NHR^1 \end{array}$$

I characterized in that a 3-aminopyrazinoic acid hydrazide of structure II is caused to react with a compound of structure III $$X-\underset{Y}{\overset{N}{\diagdown}}\underset{N}{\diagup}-NH_2 \qquad Z=C=NR^1$$
$$\phantom{X}-CONHNH_2$$

II           III wherein in each of the foregoing structures X is selected from hydrogen and an amino group having the structure —NR⁵R⁶ wherein R⁵ is selected from
  (1) hydrogen,
  (2) lower alkyl and
  (3) lower alkenyl;

R⁶ is selected from
  (1) hydrogen,
  (2) lower alkenyl,
  (3) lower alkynyl,
  (4) C₃₋₇ cycloalkyl,
  (5) phenyl and substituted phenyl, wherein the substituent(s) are selected from halogen, lower alkyl and lower alkoxy,
  (6) lower alkoxy,
  (7) pyridylamino and pentamethyleneamino,
  (8) lower alkyl and substituted lower alkyl wherein the substituent(s) are selected from
    (a) lower alkoxy,
    (b) C₃₋₆ cycloalkyl,
    (c) furyl,
    (d) pyridyl,
    (e) phenyl and substituted phenyl wherein the substituent(s) are selected from halogen, lower alkyl and lower alkoxy,
    (f) —NR⁷R⁸ wherein R⁷ is selected from
  (i) lower alkyl and
  (ii) lower alkylcarbonyl, R⁸ is lower alkyl and R⁷ and R⁸ taken together with the nitrogen to which they are attached form a 5–6 membered ring selected from piperidino, pyrrolidinyl, morpholino, piperazinyl, N-lower alkyl piperazinyl, and R⁵ and R⁶ taken together with the nitrogen to which they are attached form a 5- to 6-membered ring selected from piperidino, pyrrolidinyl, morpholino, piperazinyl and N-lower alkyl piperazinyl;

Y is selected from hydrogen, lower alkyl, halogen and phenyl;

Z is selected from oxygen and sulfur; and

R¹ is selected from hydrogen, lower alkyl, lower alkenyl, phenyl, halophenyl and phenyl-lower alkyl.

2. A process as claimed in claim 1 wherein the reactant III has the structure O=C=NR to give a produce having the structure

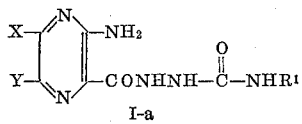

I-a wherein X, Y and R¹ have the meaning assigned in claim 1.

3. A process as claimed in claim 1 wherein reactant III has the structure S=C=NR to provide a product having the structure

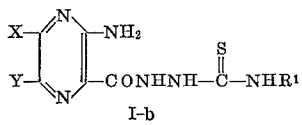

I-b wherein in each of the foregoing compounds X, Y and R¹ have the meaning assigned in claim 1.

4. A process as claimed in claim 1 wherein the reaction is carried out in the presence of a solvent and with heating.

5. A process for the preparation of 1-(3-amino-6-chloropyrazinoyl)thiosemicarbozide comprising heating a solution containing 3-amino-6-chloropyrazinoic acid hydrazide and potassium thiocyanate in an acid medium.

6. A process for the preparation of 1-{3-amino-5-[2-(2-pyridyl)hydrazino] - 6 - chloropyrazinoyl}thiosemicarbazide which comprises heating a solution containing 3-amino-5-[2-(2 - pyridyl)hydrazino] - 6 - chloropyrazinoic acid hydrazide and potassium thiocyanate in an acid medium.

7. A process for the preparation of 1-(3,5-diamino-6-chloropyrazinoyl) - 4 - allylthiosemicarbazide which comprises heating a reaction mixture containing 3,5-diamino-6-chloropyrazinoic acid hydrazide and allyl isothiocyanate.

8. A compound having the structure

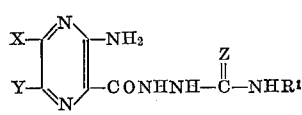

wherein X is selected from hydrogen and an amino having the structure —NR⁵R⁶ wherein R⁵ is selected from
(1) hydrogen,
(2) lower alkyl and
(3) lower alkenyl;

R⁶ is selected from
(1) hydrogen,
(2) lower alkenyl,
(3) lower alkynyl,
(4) $C_{3-7}$ cycloalkyl,
(5) phenyl and substituted phenyl, wherein the substituents(s) are selected from halogen, lower alkyl and lower alkoxy,
(6) lower alkoxy,
(7) pyridylamino and pentamethyleneamino,
(8) lower alkyl and substituted lower alkyl wherein the substitlent(s) are selected from
 (a) lower alkoxy,
 (b) $C_{3-6}$ cycloalkyl,
 (c) furyl,
 (d) pyridyl,
 (e) phenyl and substituted phenyl wherein the substituent(s) are selected from halogen, lower alkyl and lower alkoxy,
 (f) —NR⁷R⁸ wherein R⁷ is selected from
 (i) lower alkyl and
 (ii) lower alkylcarbonyl, R⁸ is lower alkyl and R⁷ and R⁸ taken together with the nitrogen to which they are attached form a 5–6 membered ring selected from piperidino, pyrrolidinyl, morpholino, piperazinyl, N-lower alkyl piperazinyl, and R⁵ and R⁶ taken together with the nitrogen to which they are attached form a 5- to 6-membered ring selected from piperidino, pyrrolidinyl, morpholino, piperazinyl and N-lower alkyl piperazinyl;

Y is selected from hydrogen, lower alkyl, halogen and phenyl;

Z is selected from oxygen and sulfur; and

R¹ is selected from hydrogen, lower alkyl, lower alkenyl phenyl, halophenyl and phenyl-lower alkyl.

9. A product as claimed in claim 8 wherein Z is oxygen and X, Y, R¹ each have the meaning assigned in claim 8.

10. A compound a claimed in claim 8 wherein X is hydrogen, Y is chloro, Z is oxygen and R¹ is phenyl.

11. A compound as claimed in claim 8 wherein X is hydrogen, Y is chlorine, Z is sulfur, and R¹ is hydrogen.

12. A compound as claimed in claim 8 wherein X is 2-pyridylhydrazino, Y is chloro, Z is sulfur and R¹ is hydrogen.

13. A compound as claimed in claim 8 wherein X is amino, Y is chloro, Z is sulfur and R¹ is allyl.

References Cited

UNITED STATES PATENTS 3,444,165   5/1969   Pollak et al. _____ 260—250

NICHOLAS S. RIZZO, Primary Examiner

U.S. Cl. X.R.

260—247.1, 247.2; 424—250

UNITED STATES PATENT OFFICE
CERTIFICATE OF CORRECTION

Patent No. 3,555,024          Dated January 12, 1971

Inventor(s) Edward J. Cragoe, Jr., John B. Bicking & Shepard Kenneth ]

It is certified that error appears in the above-identified patent and that said Letters Patent are hereby corrected as shown below:

In column 1, line 55, change "od" to read ---or---. In Table I, correct the first structure in Equation A to read as follows:

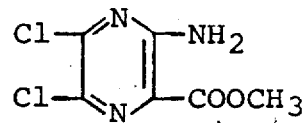

in Preparation A-6, change the structure in the "$R^5$" column to read as follows:

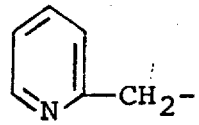

in Preparation A-8, in the "Calculated N" column, change "42.34" to read ---24.34---; in Preparation A-9, change the structure in the "$R^5$" column to read as follows:

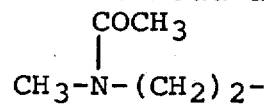

in Preparation A-11, change the structure in the "$R^5$" column t read --- $(C_2H_5)_2NCH_2CH_2$- ---; in Preparation A-17, in the "Found N" column, change "5.17" to read ---21.17---; in Prepar tion A-19, correct the structure in the "$R^5$" column to read as follows:

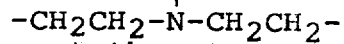

in Preparation A-20, correct the structure in the "$R^5$" column to read --- $-CH_2-CH_2-O-CH_2-CH_2$- ---; and in Preparation A-21, in the "Found N" column, change "16.55" to read ---16.52---. In column 6, line 67, correct the empirical formula to read ---$C_{10}H_{16}ClN_7O$---; line 68, change "N, 34.22" to read ---N, 34.32---; in line 71, change "hydrazinol" to read ---hydrazino---; and in line 72, change "hydrazinol" to read ---hydrazino---. In Table II,

UNITED STATES PATENT OFFICE
CERTIFICATE OF CORRECTION

Patent No. 3,555,024         Dated  January 12, 1971

Inventor(s) Edward J. Cragoe, Jr., John B. Bicking & Kenneth L. Shepard

PAGE - 2

It is certified that error appears in the above-identified patent and that said Letters Patent are hereby corrected as shown below:

in Preparation B-13, change the formula to read ---$C_{10}H_{16}ClN_7O_2$--; in Preparation B-43, change the formula in the "X" column to read ---$CH{\equiv}CCH_2NH$- ---; in Preparation B-46, in the "Y" column, change "C" to read ---Cl---; in Preparation B-47, in the "Y" column, change "C" to read ---Cl---. In column 11, line 21, change the empirical formula to read ---$C_{12}H_{11}ClN_6O_2$---. In Table III, Example No. 52, correct the structure in the "X" column to read --- $CH{\equiv}CCH_2NH$- ---. In column 16, line 52, correct the empirical formula to read ---$C_6H_8ClN_7OS$---. In column 18, line 30, immediately following the word "two" add the following:

---hours. The reaction mixture is diluted with water (250 ml.) and the resulting solid is collected and dried to give 6.53 g. (79%) of 1-(3,5-diamino-6-chloropyrazinoyl)-4- ---;

and in line 42, change "pentamethylenehydrazine" to read ---pentamethylenehydrazino---. In Table IV, Example No. 78, correct the structure in the "X" column to read ---$CH_2{=}CHCH_2NH$- ---; and in Example No. 97, in the structure in the "X" column change "$CH_3N$" to read ---$CH_3$-N---.

Signed and sealed this 31st day of August 1971.

(SEAL)
Attest:

EDWARD M. FLETCHER, JR.
Attesting Officer

ROBERT GOTTSCHALK
Acting Commissioner of Patent